Dec. 13, 1966   J. T. ATKINSON, JR., ETAL   3,290,811

INDICATOR

Filed April 14, 1964

Inventors.
Jerome T. Atkinson, Jr.
Elliott M. Moore
By: Stone, Nierman, Burmeister & Zummer
Attys.

United States Patent Office 3,290,811
Patented Dec. 13, 1966

3,290,811
INDICATOR
Jerome T. Atkinson, Jr., 1523 Elmwood Ave., Wilmette, Ill., and Elliott M. Moore, 2114 Central St., Evanston, Ill.
Filed Apr. 14, 1964, Ser. No. 359,706
6 Claims. (Cl. 40—70)

This invention relates to an indicator and more particularly to an indicator which is composed of a plurality of flat parts including the means for fastening the various parts together.

In the manufacture of inexpensive indicators, such as, those types of indicators which are generally classified as dial indicators, it is appreciated that a considerable portion of the cost of manufacturing the indicators resides in the assembly of the indicators. It is appreciated that inasmuch as these indicators are often given away, substantial savings could be effected if the recipients of the indicators would assemble them. It is also recognized that it is desirable to keep all portions of such an indicator together as one unit prior to assembly into an indicator. Thus, the means for fastening the parts together should be a part of the unit. In view of the fact that most of the indicators are made of paper, it is readily apparent that it is particularly desirable to provide a construction wherein the indicating parts of the indicator, along with the fastening device, are pre-cut in a sheet of heavy paper, and a recipient need only press out the parts and assemble them as desired. It should also be further noted that many of the indicators are utilized as a "give-a-way" item with a product when the product is sold; therefore, the indicator should be attachable to a package for the product or to the product itself. It is, therefore, a principal object of the herein-disclosed invention to provide a novel construction for a dial type indicator in which all of the elements of the indicator are formed out of a single sheet of material.

It is a further object of the present invention to provide an improved indicator construction which construction may be made a part of a sheet which sheet also carries advertising material and may be readily attached to a container for a product or to a product.

It is another object of this invention to provide a new dial indicator construction in which the entire dial indicator is made of a sheet of heavy paper.

It is still another object of the herein-disclosed invention to provide a novel fastener construction in which the fastener is made of a sheet of heavy paper and may be readily formed into a locking fastener without use of special tools or equipment.

Other objects and uses of the instant invention will become readily apparent to those skilled in the art upon a perusal of the following specification in light of the accompanying drawing in which.

Figure 1:
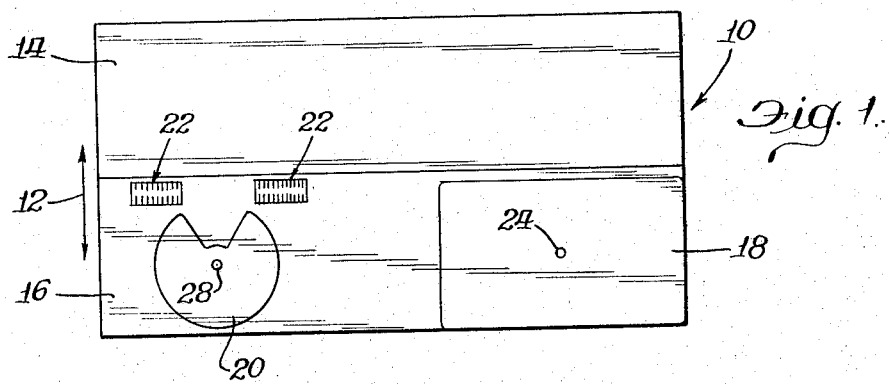
FIGURE 1 is a plan view of a sheet embodying the herein-disclosed invention showing parts of a dial indicator press cut in said sheet.
Figure 2:
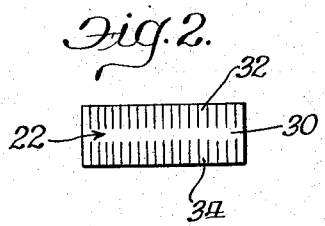
FIGURE 2 is a plan view of a fastener in a flat attitude after being pressed out of the sheet shown in FIGURE 1.

Referring now to the drawing and especially to FIGURE 1, a sheet generally indicated by numeral 10 is shown therein. The sheet 10 is a heavy paper sheet in which the grain of the paper extends in the direction shown by arrow 12. The sheet 10 is divided into two parts, that is, a header 14 which is adapted for having advertising material printed thereon, but none is shown in this instance, and a carrier 16 which is formed integral with the header.

The carrier has four parts press cut therein. A base 18 is press cut in one portion of the carrier and a generally circular dial 20 is press cut in another portion of the carrier. A pair of identical fasteners 22 are also press cut out of the carrier 16 adjacent to the dial. It may be appreciated that inasmuch as the four parts are press cut in carrier 16, all of the parts stay a portion of the carrier until the parts are pressed out.

It may be readily seen that the base 18 is thin, that is, it has a thickness of the sheet 10 and is generally rectangular in shape. The base has an aperture 24 press cut in its central portion and this aperture is pressed out when needed. The dial 20 has a generally circular outer periphery with a window 26 formed therein and opening onto the outer periphery of the dial. The dial also has an aperture 28 formed in its center by a press cut, which aperture is formed when the material is pressed out of the aperture of the dial. The aperture of the dial is registerable with the aperture of the base for reasons which will become apparent hereinafter.

The fastener 22 has an elongated axle strip 30 in its central portion and the length of the strip is transverse the grain of the paper. The strip has a plurality of identical tangs 32 formed integral therewith. These tangs 32 are uniform in width and are formed by press cutting slots into the fastener perpendicular to strip 30. A second plurality of identical tangs 34 is press cut into the opposite edge of the strip 30.

Figure 5:
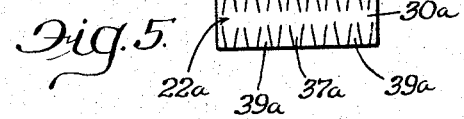
FIGURE 5 is a plan view of a fastener similar to that shown in FIGURE 2, but with tangs having alternately diverging and converging widths.

Although the fastener 22 has tangs of a uniform width, it may be appreciated that a fastener, such as, fastener 22a, shown in FIGURE 5, may be made. The fastener 22a also includes an elongated axle strip 30a which has a plurality of tangs formed with one edge. In this instance, the strip 30 has converging tangs 33a formed intetgral with the strip, and positioned between adjacent converging tangs are diverging tangs 35a so that the plurality of tangs has alternately converging and diverging tangs. The opposite edge of strip 30a has a plurality of converging tangs 37a formed integral therewith with diverging tangs 39a interposed the converging tangs so that the opposite edge of strip 30a also has alternately converging and diverging widths for its tangs.

Figure 3:
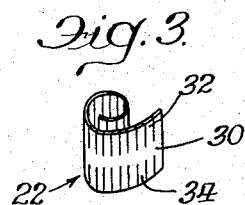
FIGURE 3 is a perspective view of the fastener shown in FIGURE 2, but in a partially rolled position.
Figure 4:
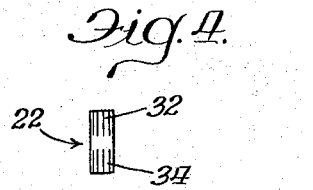
FIGURE 4 is a side elevation of the fastener shown in FIGURE 2, but in a fully rolled attitude.
Figure 6:
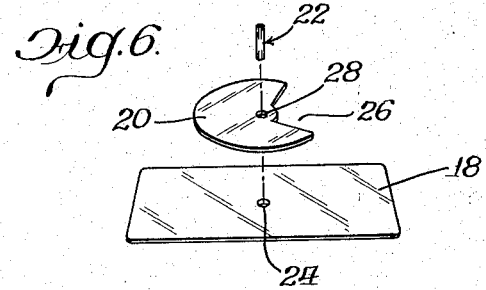
FIGURE 6 is a perspective exploded view of a base and a dial pressed out of the sheet shown in FIGURE 1 with the fastener of FIGURE 4 in position for insertion through apertures in the dial and the base.
Figure 8:
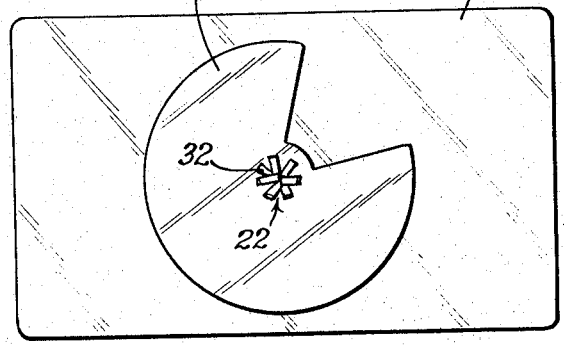
FIGURE 8 is a plan view of the indicator shown in FIGURE 7.
Figure 9:
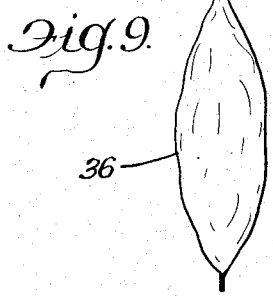
FIGURE 9 is a side elevation showing the sheet of FIGURE 1 attached to a bag.
Figure 7:
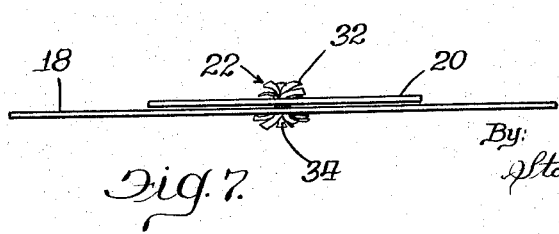
FIGURE 7 is a side elevation of an assembled indicator embodying the instant invention.

Looking now to FIGURE 9, it may be seen that sheet 10 may be attached to a bag 36 by convenient fastening means, such as, a staple, which is not shown. It may be readily appreciated that the header 14 may contain any suitable advertising material and the carrier 16, of course, carries the dial indicator. When a purchaser obtains the bag 16 with sheet 10 attached, he need only press out the base and dial and then the fastener to assemble his own dial indicator. The apertures 24 and 28 are formed in the base and dial respectively by pressing out the pre-cut material in the apertures. A fastener 22 is pressed out of the carrier, and then the strip 30 is rolled in a generally spiral fashion as shown partially in FIGURE 3. After the fastener 22 has been formed into a generally cylindrical configuration as shown in FIGURE 4, it is ready for insertion into the apertures 24 and 28. The aperture of the dial is placed in registry with aperture 24 of the base substantially as shown in FIGURE 6. The fastener is then placed into the two apertures and the tangs are bent relative to the strip to the attitude shown in FIGURES 7 and 8. At this point, it should be noted that it is important that the grain of the paper extend along the length of the tangs or fingers. It may be appreciated that if the grain of the paper is transverse the length of the tangs, there is a greater likelihood for the tangs to break off along the line where the tangs are bent. By making the length of the tangs along the same direction as the grain of the paper, there is improved strength of the tangs. It might also be noted that this holds true for other fibrous materials which have grain.

With the tangs 32 folded over so that they engage dial 20 and tangs 34 folded over so that they engage base 18, it may be appreciated that the dial and the base are fastened together in a rotatable relationship. The folded tangs are an enlarged fastening portion of the fastener which holds the dial and base together. The axle strip provides an axle for rotation of the dial relative to the base.

It may be readily appreciated that any suitable marking indicia may be placed on the base and the dial, depending on the particular dial indicator which is to be formed. For instance, the dial indicator could be used to describe dancing information or relative sizes, such as, in a chart.

It may be readily appreciated that the fastener 22a is used in the same manner in which the fastener 22 is used. The fastener 22a provides an advantage in that the alternately converging and diverging tangs provide increased strength and locking for the fasteners.

It may also be noted that the sheet 10 provides two fasteners 22. The primary purpose of providing two fasteners is that should one of the fasteners be ruined in the insertion of the fastener in the apertures, another fastener is readily available so that the dial indicator may be made up by the recipient.

It is readily apparent that the above described construction for a dial indicator provides substantial economies in making a "give-a-way" indicator. It is necessary for only printing to be done and have the dial indicator press cut in the carrier sheet. The cost of assembly is eliminated inasmuch as the recipient of the dial indicator does his own assembly. Furthermore, there is no need for a container inasmuch as the carrier is also the container for the instant dial indicator. It should also be noted that the storage of the instant indicators is simplified inasmuch as only flat sheets need be stored instead of assembled indicators.

Although a specific embodiment of the herein-disclosed invention has been described and shown herein, it is to be expressly understood that those skilled in the art may make various modifications and changes without departing from the spirit and scope of the instant invention. The present invention is limited only by the appended claims.

What is claimed is:

1. A paper sheet having a grain extending in one direction comprising, a header, a carrier formed integral with said header, said carrier having a base press cut therein for easy removal fromteh carrier, said base having an apeture press cut therein, a dial having a generally circular outer periphery and a window opening onto said periphery press cut in said carrier, said dial having an aperture press cut therein, and a pair of fasteners press cut in said carrier, each of said fasteners having a plurality of elongated fingers along one edge and said fingers having the grain of the paper extending along the length of the fingers, each of said fasteners having a second plurality of elongated fingers along the opposite edge thereof and each of the fingers of the second plurality of fingers having the grain of the paper extending along the length of the fingers.

2. A substantially flat carrier of a fibrous material having a grain in one direction comprising, a base press cut in said carrier for easy removal therefrom, said base having an aperture press cut therein, a dial press cut in said carrier for easy removal therefrom, said dial having an aperture press cut therein, and a fastener press cut in said carrier for easy emoval therefrom, said fastener having a plurality of elongated tangs with the length of the tangs extending in the direction of the grain of the material, whereby the base is removed along with the dial, the fastener is removed and rolled and positioned in the apertures of the dial and base and the tanges are spread to fasten the dial to the base.

3. A fastener made of a sheet fibrous material having a grain of the fibers extending in one direction comprising an elongated strip having its length across the direction of the grain of the fibers and being rolled into a spiral, a plurality of elongated tangs formed integral with one edge of said strip, a second plurality of tangs formed integral with the opposite edge of the strip, each of said tangs having its length extending along the direction of the grain of the fibers, whereby the tangs may be selectively bent relative to the strip to provide an expanded holding portion on opposite edges of the strip.

4. A fastener made of paper having a grain in one direction comprising an elongated strip having its length extending across the grains of the paper, said strip having a plurality of elongated fingers formed integral with one edge, a second plurality of elongated fingers being formed integral with the opposite edge, each of said fingers having uniform width and having its length extending along in the same direction as the grain of the paper.

5. An indicator comprising, in combination, a base formed of a fibrous material and having an aperture contained therein, a dial formed of the same material as the base and having an aperture registerable with the base, and a fastener formed of the same material as the base and said material having a grain to the fiberous material, said fastener having an axle portion positioned in the aperture of the base and the dial, said fastener having a plurality of elongated tangs with the length of the tangs extending in the direction of the grain of the material formed integral with one edge of the axle portion and being engageable with the dial, and said fastener having a second plurality of elongated tangs with the fibrous grain extending along the same direction as the length of the tangs and said tangs being formed integral with the other end of the axle portion and being engagable with the base to hold the base and dial in a rotatable relationship.

6. An indicator comprising, in combination, a substantially flat thin base made of a fibrous material and containing an aperture, a substantially flat thin dial generally defining a circle and being formed of the same material as the base, said dial having a window contained therein opening onto its outer periphery and having an aperture registerable with the aperture of the base and a fastener being formed of the same material as the base and the dial and said material having a grain to its fiber, said fastener having an axle strip being formed of a flat material coiled into a generally spiral configuration, said fastener having a plurality of elongated tangs with the grain of the material extending along the length of each of said tangs and said tangs being formed integral with one edge of the axle strip and being engageable with the dial, and said fastener having a second plurality of elongated tangs with the grain of the fiber material extending along the length of the tangs and said tangs being formed integral with the other edge of the axle strip and being engageable with the base to hold the base and the dial in a rotatable relationship.

(References on following page)

References Cited by the Examiner

UNITED STATES PATENTS

| | | | |
|---|---|---|---|
| 47,843 | 5/1865 | Maynard | 24—96 |
| 352,949 | 11/1886 | Griffith | 40—70 |
| 356,202 | 1/1887 | Kempshall | 24—67.1 |
| 451,845 | 5/1891 | Schultz | 24—67 |
| 1,178,738 | 4/1916 | Lichter | 24—96 X |
| 2,317,047 | 4/1943 | Foote | 35—74 X |
| 3,103,080 | 9/1963 | Desmond | 40—70 |
| 3,199,231 | 8/1965 | Ruderian | 40—70 X |

EUGENE R. CAPOZIO, *Primary Examiner.*

W. GRIEB, *Assistant Examiner.*